(12) United States Patent
Andrews et al.

(10) Patent No.: US 6,229,114 B1
(45) Date of Patent: May 8, 2001

(54) PRECISION LASER CUTTING OF ADHESIVE MEMBERS

(75) Inventors: John R. Andrews, Fairport; Brian S. Hilton; Steven R. Moore, both of Rochester; Roy A. Trowbridge, Jr., Palmyra; Gary D. Redding, Victor; William G. Hawkins, Webster; C. Glenn Prince, Palmyra, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/409,431

(22) Filed: Sep. 30, 1999

(51) Int. Cl.[7] .................................................. B23K 26/38
(52) U.S. Cl. .................................. 219/121.72; 219/121.71
(58) Field of Search ........................... 219/121.7, 121.71, 219/121.72, 121.2; 347/47

(56) References Cited

U.S. PATENT DOCUMENTS

| | | |
|---|---|---|
| 4,095,237 | 6/1978 | Amberntsson et al. . |
| 4,419,678 | 12/1983 | Kasugayama et al. . |
| 4,463,359 | 7/1984 | Ayata et al. . |
| 4,771,295 | 9/1988 | Baker et al. . |
| 4,774,530 | 9/1988 | Hawkins . |
| 4,791,438 | 12/1988 | Hanson et al. . |
| 5,091,284 | 2/1992 | Bradflied ........................ 219/121.68 |
| 5,208,604 | 5/1993 | Watanabe et al. . |
| 5,208,980 * | 5/1993 | Hayes .............................. 219/121.72 |
| 5,233,369 | 8/1993 | Carlotta et al. . |
| 5,305,018 * | 4/1994 | Schantz et al. . |
| 5,312,517 | 5/1994 | Ouki . |
| 5,320,789 | 6/1994 | Nishii et al. . |
| 5,408,738 * | 4/1995 | Schantz et al. . |
| 5,415,939 | 5/1995 | Yeung . |
| 5,442,384 | 8/1995 | Schantz et al. ........................ 347/20 |
| 5,696,546 | 12/1997 | Narang et al. ........................ 347/87 |
| 6,120,131 * | 9/2000 | Murthy et al. . |

OTHER PUBLICATIONS

Dale R. Ims et al. "Method of Operation of Ink Jet Printer" Xerox Disclosure Journal—vol. 16, No. 4 Jul./Aug. 1991, p. 203.

* cited by examiner

Primary Examiner—Geoffrey S. Evans
(74) Attorney, Agent, or Firm—Oliff & Berridge, PLC

(57) ABSTRACT

A process for precision patterning or cutting of a sheet stock, such as an adhesive tape, includes the step of irradiating a surface of a sheet stock with an irradiation source to pattern or cut a part in the sheet stock. The method is particularly useful for precision cutting adhesive members, such as adhesive fluid seals, for an inkjet print cartridge.

30 Claims, 8 Drawing Sheets

PRECISION LASER CUTTING OF ADHESIVE MEMBERS

BACKGROUND OF THE INVENTION

1. Field of Invention

The present invention is directed to precision cut fluid seals, such as for use in any microfluidic device including ink jet print cartridges, and methods for precision cutting such fluid seals. In particular, the present invention is directed to precision cutting methods using a laser cutting source.

2. Description of Related Art

Making a connections between two fluid containing or transporting components is widely practiced. In the new and emerging area of microfluidics, the fluid carrying components are small, in the range of 500 microns down to as small as 1 micron and possibly even smaller. For a general description of this class of devices, see for example, the conference proceedings "Microfluidic Devices and Systems," *Proceedings of the SPIE,* Vol. 3515 (1998). Microfluidic devices pose challenges in fluid path connection both within the microscopic componentry and also for the connection between a microfluidic device and macroscopic fluid containers or transporters. Such microfluidic devices are important in a wide range of applications that include drug delivery, analytical chemistry, microchemical reactors and synthesis, genetic engineering, and marking technologies including a range of ink jet technologies including thermal ink jet.

In existing thermal ink jet printing, such as disclosed in U.S. Pat. No. 4,774,530, the print cartridge comprises one or more ink filled channels, communicating with a relatively small ink supply chamber or manifold, at one end and having an opening at the opposite end, referred to as a nozzle. A thermal energy generator, usually a resistor, is located in each of the channels, a predetermined distance from the nozzles. The resistors are individually addressed with a current pulse to momentarily vaporize the ink and form a bubble, which expels an ink droplet. As the bubble grows, the ink bulges from the nozzle and is contained by the surface tension of the ink as a meniscus. As the bubble begins to collapse, the ink still in the channel between the nozzle and resistor starts to move towards the collapsing bubble, causing a volumetric contraction of the ink at the nozzle and resulting in the separation of the bulging ink as a droplet. The acceleration of the ink out of the nozzle while the bubble is growing provides the momentum and velocity of the droplet in a substantially straight-line direction towards a recording medium, such as paper. Because the droplet of ink is emitted only when the resistor is actuated, this general type of thermal ink jet printing is known as "drop-on-demand" printing.

U.S. Pat. No. 5,736,998 describes an improved ink seal between a nozzle plate and the pen cartridge in an ink jet printhead. Though mention is made of optimized shape and the use of a dispensed bead of adhesive, no mention is made of a laser cut seal or a discreet fluid seal member.

Another exemplary print cartridge is disclosed in U.S. Pat. No. 4,463,359. The disclosed print cartridge has one or more ink-filled channels, which are replenished by capillary action. A meniscus is formed at each nozzle to prevent ink from weeping therefrom. A resistor or heater is located in each channel upstream from the nozzles. Current pulses representative of data signals are applied to the resistors to momentarily vaporize the ink in contact therewith and form a bubble for each current pulse. Ink droplets are expelled from each nozzle by the growth and collapse of the bubbles. The current pulses to the heater are shaped to prevent the meniscus from breaking up and receding too far into the channels after each droplet is expelled. In addition, various embodiments of linear arrays of thermal ink jet devices are known, such as those having staggered linear arrays attached to the top and bottom of a heat sinking substrate and those having different colored inks for multiple colored printing.

Previously, a typical end-user product in this art was a cartridge in the form of a prepackaged, usually disposable, item comprising a sealed container holding a supply of ink and, operatively attached thereto, a die module having a linear or matrix array of channels. Presently, however, products are designed using a more permanent (or at least multi-use) print cartridge connected to a replaceable ink tank unit. Generally, the cartridge or print cartridge unit may include terminals to interface with the electronic control of the printer; electronic parts in the cartridge itself are associated with the ink channels in the print cartridge, such as the resistors, as well as digital means for converting incoming signals for imagewise operation of the heaters. In one common design of printer, the cartridge is held with the print cartridge in close proximity to the sheet on which an image is to be rendered, and is then moved across the sheet periodically, in swaths, to form the image, much like a typewriter. Full-width linear arrays, in which the sheet is moved past a linear array of channels that extends across the full width of the sheet, are also known. Typically, cartridges are purchased as needed by the consumer and used either until the supply of ink is exhausted, or, equally if not more importantly, until the amount of ink in the cartridge becomes insufficient to maintain the back pressure of ink to the print cartridge within the useful range.

However, in many of the various print cartridge designs, an important feature of the print cartridge is the fluid seal, generally located between the ink supply manifold and the ink drop ejecting die module. The fluid seal is important because it must ensure a tight seal between the ink manifold and the die module. If a tight seal is not maintained, then ink can leak out of the print cartridge through the connection area and/or air and other contaminants can be introduced into the print cartridge and ink supply. A second important function is to seal the ink manifold fluid path in areas adjacent to the die module.

One example of a fluid seal is disclosed in U.S. Pat. No. 5,696,546, which describes an ink cartridge for an ink jet printer, having an ink supply in a housing in fluid communication with an ink supply manifold. The ink is contained in an absorbent material in the ink supply, which has a housing floor having a vent and an ink outlet into a manifold. The manifold is an elongated recess in the outer surface of the housing. There can be a single or multiple chambers connected to a single or multiple ink supplies, depending on whether the print cartridge is a monochrome or multicolor print cartridge. The chamber or chambers in the manifold have a common flat surface. A fluid seal or film member is bonded to this flat surface by an adhesive not attacked or eroded by the ink. This bond between the fluid seal and manifold must prevent ink from leaking from the manifold or ink leaking between chambers within the manifold. There is at least one via or opening that goes all of the way through the fluid seal for each chamber in the manifold. These vias provide fluid communication between each manifold chamber and an inlet of the die module. The surface of the film member opposite the surface bonded to the manifold is coated with a thermosetting adhesive, which bonds to a die module surface containing the ink inlets. The die module ink inlet is of similar size and is aligned with the vias in the fluid seal. The adhesive makes a seal around the via in the fluid seal and the inlet to the die module to provide a fluid communication path between a chamber of the manifold and the inlet to the die module while preventing fluid from leaking out of the desired fluid path. The adhesive bonding the fluid seal to the housing floor is either a pressure sensitive adhesive or the same thermosetting adhesive as is used on the other side of the film member. In this reference, the fluid seal is cut using a die cutting method.

As generally practiced in the art, fluid seals and other parts are cut from multilayer sheet stock using a die cutting process. For an application such as the creation of fluid seals, the shortcomings of die cutting include large design rules, both distortion of the adhesive or other layers near cut edges and long range distortion, the use of lubricants, generation of debris, and difficulty in making controlled-depth cuts.

Design rules for die cut parts will depend on the thickness of the sheet stock. The typical thickness of the multiple layer sheet stock used to make fluid seals is between 250 $\mu$m and 500 $\mu$m. For these typical sheet stock thicknesses, the minimum dimensions for vias are of the order of 300 $\mu$m×300 $\mu$m, and minimum areas between cuts, such as between two vias or between a via and an edge, is of the order of 500 $\mu$m. The relatively large feature sizes and spacing are the result of several factors in the die cutting process. The small via size is related to both distortion of the film created by the mechanical shearing of the cutting die and to the strength of the cutting die with features of such small dimension. The large separation between features is required because the mechanical pressure can distort or in some cases tear the sheet stock between close features. Another type of distortion that requires features to be well separated is displacement of the adhesive near cut edges. This distortion can extend 100 $\mu$m to 200 $\mu$m from a cut edge. The distortion of the adhesive reduces the ability of this perturbed adhesive to form a fluid-tight bond with either the manifold or the die module. Wide separation of cut features facilitates the formation of fluid-tight bonds in the unperturbed adhesive areas away from the cut edges. Long range distortion is again the result of the mechanical nature of the die cutting process and converts the flat sheet stock to a cut part that is not flat. This can cause additional problems in creating a uniform seal between the manifold and the fluid seal and between neighboring ink inlets of the die module.

Die cutting sheet stock containing one or more thick layers of adhesive can leave adhesive on the cutting tool and cause additional distortion, failure to meet dimensional tolerances or jamming of the die cutting tool. To reduce sticking or to delay its onset, lubricants are frequently used to coat the die-cutting tool. Though the lubricant can be effective in this job, the lubricant can also modify or contaminate the adhesive so that it does not perform as well as the uncontaminated adhesive.

The die cutting process also involves shearing action between two cutters. The shearing action can create plastic fibers and adhesive strings. The larger of the plastic fibers can create a leak path if it is located between the adhesive and sealing surface. The smaller fibers can be carried by ink into the die module and clog the fine jets in the die module or otherwise impede ink flow. The adhesive strings can create difficulties in handling the fluid seal in the assembly equipment for the print cartridge or migrate to the surface of the die module containing the ink exit nozzles and interfere with the operation of the printing.

In forming the fluid seal for inclusion in a manufacturing line for automated assembly of print cartridges, it is convenient to have the fluid seal remain on a carrier tape. This can be done by not cutting through one layer, say the bottom layer, of a multi-layered sheet stock. To cut partially through the sheet stock requires good control of the cut depth. Since the adhesive layers can re-flow, it is important to separate the adhesive on opposite sides of the cut. The shearing action of die cutting can cut through the adhesive layers but, since it does not remove material, the parted adhesive has a tendency to reflow and stick back together. When this happens, the part may be difficult to remove on the manufacturing line or strings of adhesive can interfere with the assembly process. The complications and shortcomings inherent in die cutting of fluid seals presents significant design limitations on an ink jet print cartridge containing fluid seals. The complications in the creation of parts with die cutting leads to significant problems with part yield and with loss of fully assembled print cartridges. Design limitations, process limitations, and both part and print cartridge yield all lead to a significant cost associated with the die cutting process.

Laser cutting and ablation methods are generally known, and have been applied in various methods within the ink jet art as well as in other arts. U.S. Pat. No. 4,049,945 describes a method for cutting different shapes in a moving web by using both the motion of the web and the linear scanning of the laser to be able to cut individual features rather than using step and repeat and encompasses only scanned spot cutting. U.S. Pat. No. 4,639,572 describes the cutting of composite materials such as circuit boards that contain a filler and a polymer matrix and not multi-layer sheet stock. U.S. Pat. No. 5,630,308 describes a method for the scoring of packaging material using a laser such that the scored line is weakened to enable controlled tearing of the material. A process for cutting through several members while leaving one member intact is not described. U.S. Pat. No. 4,549,063 describes using a laser to make discontinuous cuts to provide perforations in an adhesive laminate. The perforations permit tearing labels off of a laminate backing.

Laser cutting methods are also known in the art for forming large parts. For example, laser patterning and cutting methods have been used in many areas, such as sheet metal fabrication, cloth cutting, and paper cutting.

Laser ablation has been used in the ink jet art to form specific features in ink jet die modules, such as ink passageways, orifices, and the like. U.S. Pat. No. 5,208,604 describes an ink jet head wherein the ink discharge opening is formed by laser ablation, i.e., by irradiating an excimer laser onto the discharge opening plate. Similarly, U.S. Pat. No. 5,312,517 and U.S. Pat. No. 5,442,384 disclose forming specific features in an ink jet head using laser ablation methods. However, in each of these patents, none of the cuts form a sealed fluid path between two segments of the print cartridge and the bulk part itself is cut using traditional cutting methods, and the laser is used only for forming features such as holes, lines, and the like.

SUMMARY OF THE INVENTION

There is a need to pattern sheet stock forming a continuous web of material into individual parts and to have those parts remain attached to the continuous web. The present invention enables the creation of parts that remain on a continuous web by cutting the sheet stock to a controlled depth. The controlled depth cutting permits creation of a shape or part in several layers of the sheet stock and makes it possible to not cut through at least one of the layers of the sheet stock, which forms the continouous web. The means of cutting to a controlled depth is a laser in which the total energy delivery is controlled in such a way that the cut occurs to the desired depth. Control of the total energy delivery can occur through counting pulses of laser light of known energy content, through closed loop control of the energy in the laser beam and/or through scanning at a controlled rate.

Advances in other aspects of ink jet print cartridge design and the desire to lower the cost of ink jet print cartridges means a need continues to exist for improved fluid seal designs and also for improved and more efficient methods for making such fluid seals.

This need is particularly applicable as the design of the ink jet cartridges themselves improves. For example, in previous print cartridge designs, the size of the die modules, i.e., the portions of the print cartridge that eject the ink droplets, was generally limited by such considerations as the size requirements of the microelectronic logic, power drivers, and heater elements. However, as the design of these devices improves, providing smaller and more efficient die modules, the size of the die modules can be decreased.

However, the entire size of the print cartridge is likewise constrained by other factors, such as the size requirements of the ink supply portion of the print cartridge. For example, although a smaller die module can be produced, the economies of the smaller die module can not be fully realized unless a smaller ink supply manifold can be used, or unless the smaller die module can be efficiently connected to the manifold. Thus, for example, if the fluid seal disposed between the ink supply manifold and the die module requires a large spacing between features, the die module size can not be reduced. Likewise, if a fluid seal is used that has been distorted from its intended shape by the cutting process, a good seal can not be obtained and a suitable product will not result.

The present invention makes possible the inclusion of a larger number of independent ink paths in a small die module. This can be especially important in multicolor print cartridges, where independent ink paths for each of the colors are desired. In particular, print cartridges with, e.g., the three primary colors (cyan, magenta and yellow) and black have become increasingly important for everyday printing applications. Furthermore, higher order print cartridges having five or six colors have also become more important as the demands for print quality continue to increase.

The present invention addresses these difficulties by providing a new method of producing fluid seals with smaller design rules, thereby permitting further reduction in die module size or the inclusion of a larger number of different ink paths. These improvements are made possible by using a laser cutting process to produce the fluid seals rather than a die cutting process as has been conventionally used in the art. In a broader respect, the present invention provides a cutting method that can be used to precisely cut small or precise members from a suitable sheet stock, with precision previously unavailable from mechanical die cutting processes.

Thus, in embodiments of this invention, the present invention provides a process for precision patterning of a sheet stock, comprising:

irradiating a surface of a sheet stock with an irradiation source to pattern a part in said sheet stock, and cutting to at least one controlled depth in said sheet stock with said irradiation source, wherein said part has cut features separated by 500 µm or less and having less than 25% of a separation distance between the cut features perturbed by the cutting process.

The present invention also provides discreet cut members, such as adhesive fluid seals for use in inkjet print cartridges, cut by such a method. The present invention also provides for a means of creating discreet adhesive containing members from multi-layer sheet stock by control of the depth of cutting.

BRIEF DESCRIPTION OF THE DRAWINGS

These and other advantages and features of this invention will be apparent from the following, especially when considered with the accompanying drawings, in which.

DETAILED DESCRIPTION OF PREFERRED EMBODIMENTS

Figure 1:
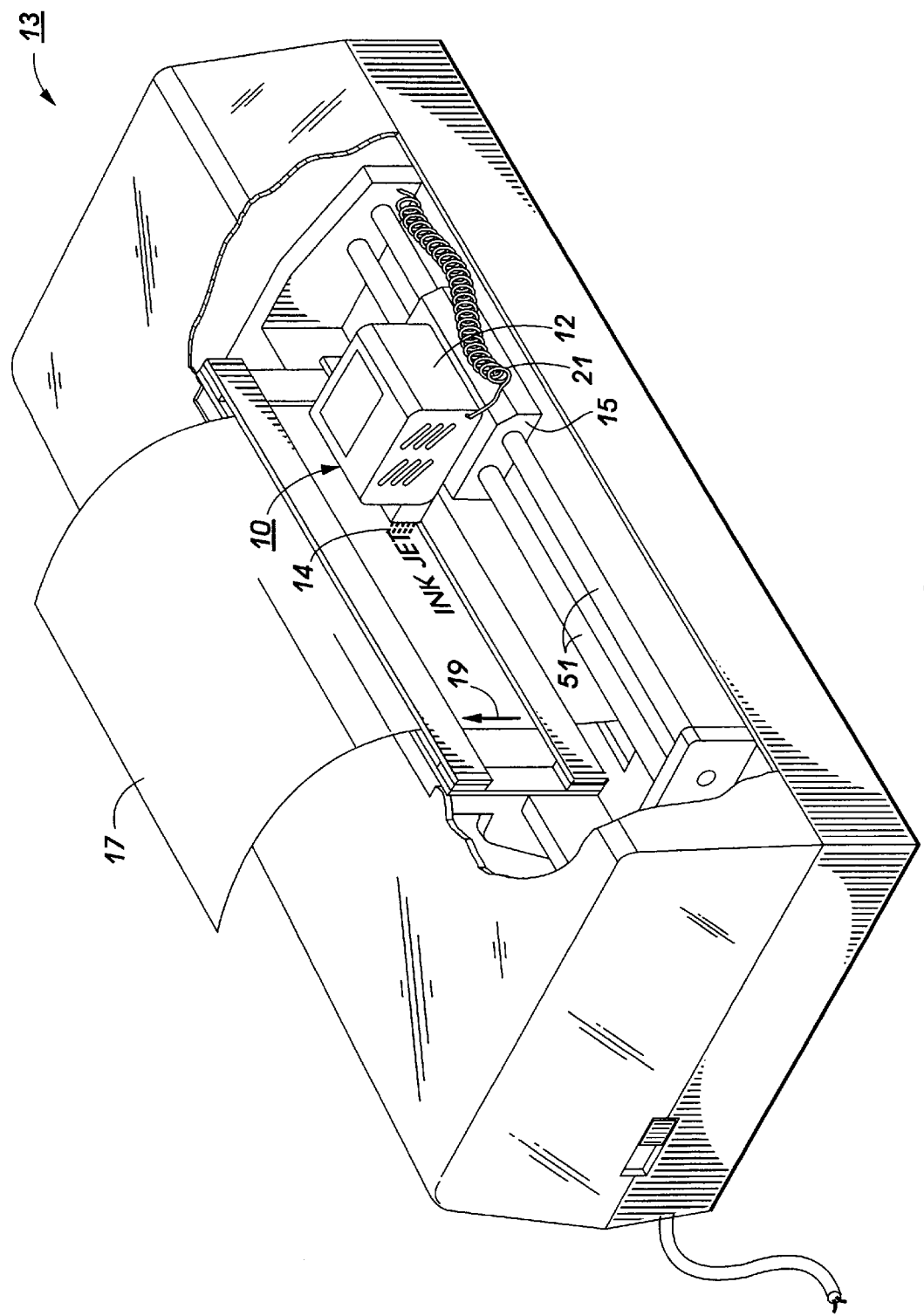
FIG. 1 is an isometric view of a thermal ink jet printer using an ink supply cartridge having a fluid seal prepared according to the present invention.

FIG. 1 is a schematic isometric view of a type of thermal ink jet printer 13 in which the print cartridge 14 and the ink supply therefor are combined in a single package, referred to hereinafter as cartridge 10. The main portion of cartridge 10 is the ink supply contained in housing 12, with another portion forming the actual print cartridge 14. In this embodiment of the invention, cartridge 10 is installed in a thermal ink jet printer 13 on a carriage 15, which is translated back and forth across a recording medium 17, such as, for example, a sheet of paper, on guide rails 51. During the translation of the cartridge 10 by the carriage 15, the cartridge moves relative to sheet 17 and prints characters or images on the sheet 17, somewhat in the manner of a typewriter. In the example illustrated, each translation of cartridge 10 along sheet 17 enables the print cartridge to print with a swath defined by the height of the array of nozzles in the print cartridge 14 and the width of the sheet. After each swath is printed, sheet 17 is indexed (by means not shown) in the direction of the arrow 19, so that any number of passes of the print cartridge 14 may be employed to generate text or images onto the sheet 17. Cartridge 10 also includes means, generally shown as cable 21, by which digital image data may be entered into the various heating elements (not shown) of print cartridge 14 to print out the desired image. This means 21 may include, for example, plug means that are incorporated in the cartridge 10 and that accept a bus or cable from the data-processing portion (not shown) of the apparatus, and permit an operative connection therefrom to the heating elements in the print cartridge 14.

Figure 2:
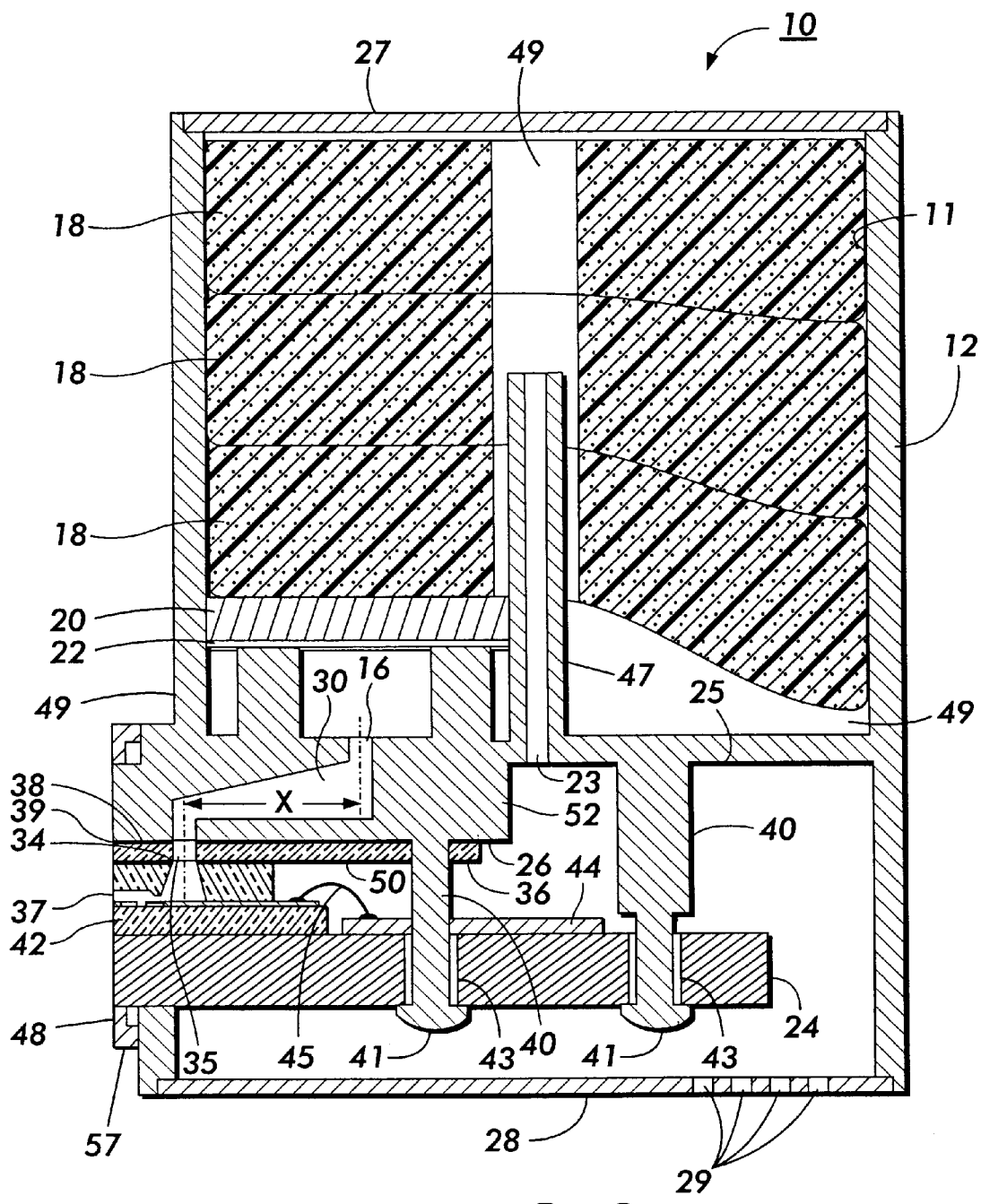
FIG. 2 is a schematic, cross-sectional elevation view of the cartridge in FIG. 1.

FIG. 2 is a schematic sectional, elevational view of cartridge 10. FIG. 2 illustrates the cartridge 10 in the form of a combination print cartridge unit and ink tank unit. The invention is clearly not limited to this specific configuration and the principles depicted in FIG. 2 apply equally to embodiments where the print cartridge and ink tank or ink tanks are separate units. The print cartridge and ink tank may be separable parts when the print cartridge lasts longer than the supply of ink in the ink tank. In this case the ink tank may be separately replaceable.

Although the embodiment of FIG. 2 is shown as having a single ink tank containing a single ink color or type, the present invention is not limited to such a single ink. The invention is especially applicable to print cartridge assemblies having multiple ink tanks because the present invention provides for more precisely cut parts.

The cartridge 10 has a main portion in the form of housing 12. Housing 12 is typically made of a lightweight but durable plastic. Housing 12 defines an internal chamber 11 for the storage of liquid ink having a floor 25 with a ventilation port or vent 23, open to the atmosphere, and an ink supply outlet 16. The ink supply manifold 30 is an elongated recess or trench formed in the thicker portion 52 of the manifold floor 25, and may be integrally molded in the chamber surface concurrently with the fabrication of the housing 12. One end of the manifold 30 is connected to the ink supply outlet 16 and the other end terminates at a location that will align with the inlet 34 to the die module 42. The distance from the center of the outlet 16 to the center of the die module inlet 34 is about 10 mm. A relatively thin film member (fluid seal) 36, having a predetermined shape and a via 35 through it, is bonded to the floor surface of the manifold 26, covering and sealing the elongated recess within the manifold 30 and preventing ink from leaking out of the manifold. The via 35 through the fluid seal is comparable in size to the die module inlet 34 and is aligned with it to form a fluid communication path between the manifold 30 and the die module inlet 34.

Figure 3:
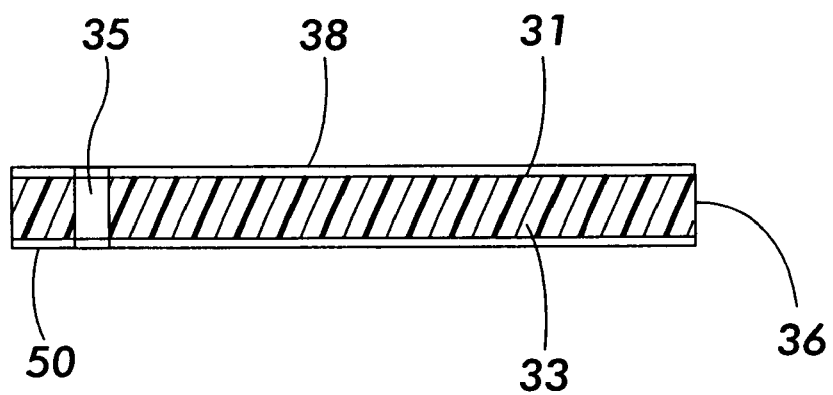
FIG. 3 is a cross-sectional view of a fluid seal.

In an embodiment of the present invention, the fluid seal has opposing surfaces 31, 33, shown in FIG. 3, with the surface 31 of the fluid seal 36 coated with a pressure sensitive adhesive 38. The other fluid seal surface 33 is coated with a thermosetting adhesive 50, such as, for example, a bisphenol A epoxy with V40® curing agent and adhesion promoter. This embodiment of the fluid seal is described in further detail in U.S. Pat. No. 5,696,546, the entire disclosure of which is incorporated herein by reference. In other embodiments of the present invention, the fluid seal 36 has opposing sides 31, 33 that are coated with the same adhesive material. That is, in the fluid seal 36 of FIG. 3 according to this embodiment, the adhesive materials 38 and 50 are the same adhesive material, which is preferably both pressure sensitive and thermosetting.

According to the present invention, the fluid seal thus generally comprises a polymeric material coated on both sides by an adhesive. Suitable polymeric materials include, but are not limited to, polyesters, polyimides, polyetheretherketones, polyamides, polysulfones, polyethersulfones, polyetherimides, mixtures thereof, and the like. Other materials can be used as will be appreciated by those skilled in the art.

As described above, the polymeric material is coated on both sides with an adhesive material. Suitable adhesives include, but are not limited to, any of the adhesives that can be processed and include those of the thermoset, thermoplastic, and pressure sensitive varieties. For example, suitable adhesives include, but are not limited to, epoxies, phenolic nitrile resins, acrylics, silicones, hot-melt thermoplastics, pressure sensitive adhesives, rubber thermosets, mixtures thereof, and the like. As also described above, the adhesives used for the opposing surfaces of the film member can be the same or different.

The film member 36 is bonded to the bottom or outer surface 26 of the manifold 30 with a suitable pressure sensitive adhesive 38 on surface 31 of the film member. The film member is shaped to fit the irregular floor surface 26 and to avoid the locating and fastening pins 40 integrally formed or molded with the housing and used to fixedly attach the print cartridge 14 and heat sink 24. The elongated recess of the manifold 30 is hermetically sealed by the fluid seal to form a closed ink passageway from the cartridge chamber 11 to the print cartridge nozzles 37.

Figure 4:
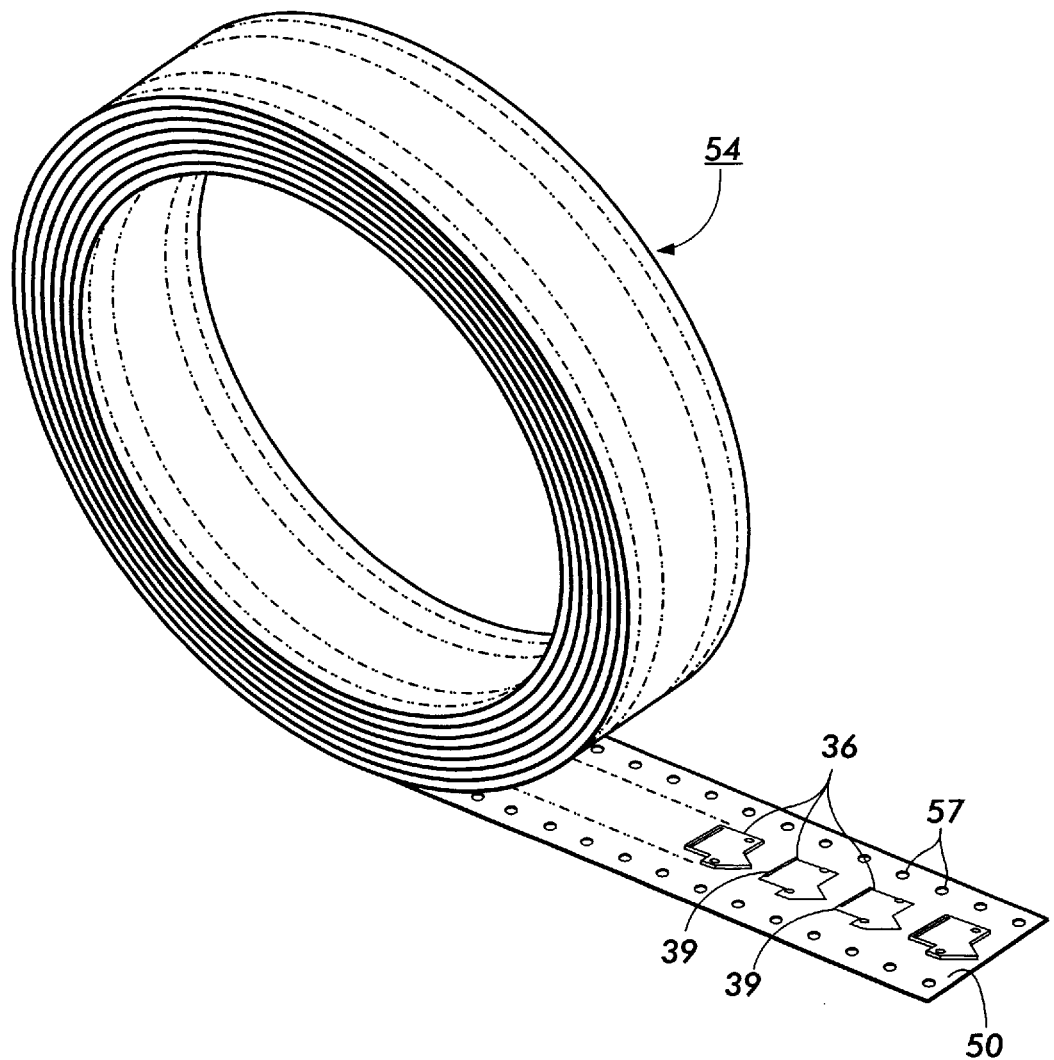
FIG. 4 is a schematic, isometric view of a roll of sheet stock that has been laser cut to contain a plurality of shaped fluid seals held onto a carrier by the tackiness of the adhesive on the surface of the fluid seal in contact with the carrier.

Although not limited thereto, the sheet stock from which the fluid seal of the present invention is made can be prepared as a long (or endless) roll 54, as shown in FIG. 4. In this manner, the fluid seals 36 are cut into the sheet stock, along with sprocket holes 57. Of course, in place of sprocket holes, the stock material can be transported by any other suitable transport means. A cross section of this sheet stock is shown in FIG. 5.

Figure 5:
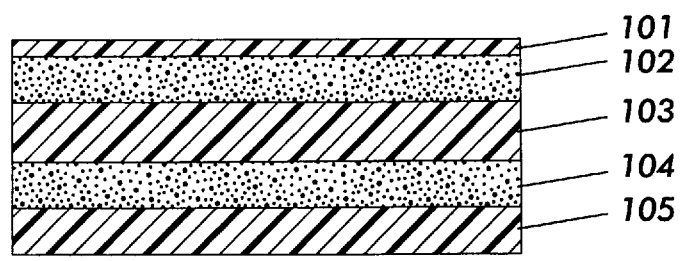
FIG. 5 is a sectional view of the fluid seal sheet stock.

As shown in FIG. 5, the sheet stock is shown as including a layer 103 of Mylar®, coated on either side by adhesive layers 102 and 104, which can be of the same or different adhesive materials. Applied to one adhesive layer is a Mylar® release liner 101, and applied to the other adhesive layer is a Mylar® backing tape 105. The sheet stock may be prepared, in embodiments, by coating the desired adhesive on both sides of a long strip of polyester film, such as Mylar®, having a thickness of about 7 mils. The adhesive layers are preferably each about 2 mils in thickness. The adhesive on one surface of the film strip is then laminated to a 3 mils thick Mylar® release carrier strip (backing tape), on the side that will bond to the chamber floor and with a thinner Mylar® release liner on the other side, which has a thickness of about 1.5 mils.

The critical features of ink via 35 and front edge 39, which is coplanar with the print cartridge nozzle face 42, and the remaining profile or periphery of the fluid seal film member, are then cut using a precision laser cutting operation, which is described below. The cutting can be adjusted so as to score to a depth of only 1 mil into the 3 mil release carrier. The scrap material is then removed, leaving a complete fluid seal with a thinner release liner covering the top adhesive surface, for example, every 1.5 inches down a 4,000 inch long polyester carrier strip. In another embodiment, the scrap material is not removed. The reel of fluid seals attached to the carrier film are fed into a pick and place zone of a robotic device (not shown) and the fluid seals are vacuum picked off the carrier strip. The fluid seal is then positioned over the housing floor surface 26 of the manifold using a vision system (not shown), and placed onto the housing floor surface 26 with a specified pressure and temperature by the robotic device. The top thinner release liner is then removed with a higher tack tape or mechanical picker (neither shown). The die module and heat sink assembly is aligned and placed onto the awaiting fluid seal. The fluid seal is bonded to the die module 42 such that the die module inlet 34 is aligned to the via 35 in the fluid seal. A printed circuit board 44 is bonded to the heat sink adjacent the die module. The terminals or contact pads (not shown) of the print cartridge 14 and circuit board 44 are interconnected by wire bonds 45. Locating holes 43 in the heat sink are used when mounting the heat sink 24 with print cartridge 14 and circuit board 44 bonded thereto to align the die module inlet and nozzle face relative to the housing by inserting the housing stake pins 40 therein. Stake pins 40 are then ultrasonically staked to form print heads 41 and the attachment of the print cartridge and heat sink assembly is complete. Optionally, the stake pins may be bonded to locating holes 43 in addition to being staked.

The wire bonds 45 are encapsulated with a thermally curable passivation material (not shown) by, for example, an injection syringe, which fills the cavity behind the print cartridge and covers the wire bonds. The housing and attached heat sink with print cartridge and circuit board is cured in an oven, thus simultaneously curing the thermosetting adhesive 50 and the wire bond encapsulating passivation material. Alternatively, the curing of the fluid seal adhesive and encapsulant can be conducted in several steps.

The cartridge 10 shown in FIG. 2 also generally includes a cosmetic bottom cover 28 with ventilation openings 29. This region of the cartridge 10 is covered by a rectangular shaped frame 48 having a lip 57 around the outer edge thereof and extending in a direction towards the housing. The ink holding medium 18 is shown as three separate portions, occupying most of the chamber 11, which is covered by a top housing cover 27. A tube 47 extends from the vent 23 to center of the interior of chamber 11 in the housing and through openings in each of the ink holding mediums. Also within housing 12 is a member made of a material providing a high capillary pressure, indicated as scavenger 20, which serves as a porous capillary barrier between the medium 18 and the output port 16. The scavenger 20 preferably further includes a filter cloth, indicated as 22, which is attached to felted melamine using a porous hot-melt laminating adhesive. Generally, one portion of the outer surface of scavenger 20 abuts the ink holding medium 18, while other portions of the surface are exposed to open space 49 between the medium 18 and the inner walls of chamber 11.

Figure 6:
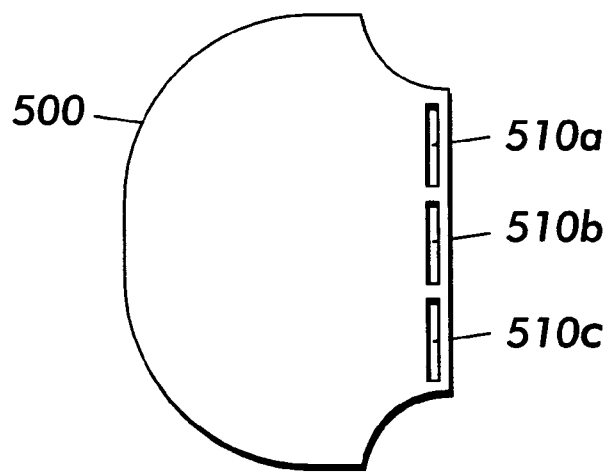
FIG. 6 depicts a fluid seal according to an embodiment of the present invention.
Figure 7:
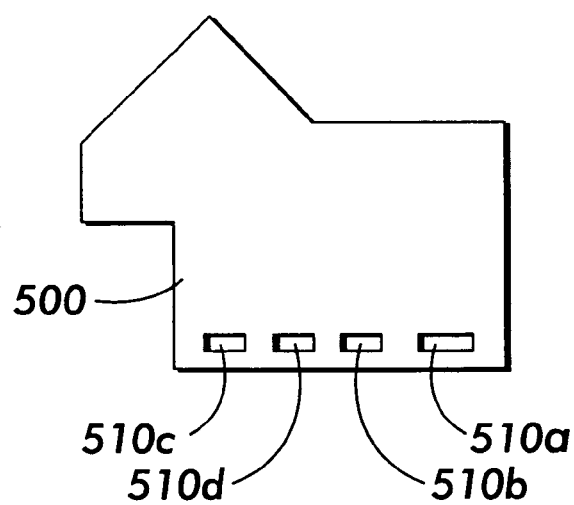
FIG. 7 depicts a fluid seal according to an embodiment of the present invention.

The design of the fluid seal is not particularly limited. Rather, as also discussed above, the cutting process of the present invention can be used to design and cut fluid seal members having higher numbers of independent ink channels. For example, alternative embodiments of the fluid seals of the present invention are shown in FIGS. 6–7. FIG. 6 shows an embodiment of the present invention where the fluid seal 500 has three through vias 510a, 510b, 510c, which can be used as independent ink channel openings. FIG. 7 shows an embodiment of the present invention where the fluid seal 500 has four through vias 510a, 510b, 510c, 510d, which provide for four independent ink paths. Furthermore, it will be recognized by those skilled in the art that the shape of the fluid seal members shown in the figures is determined by the print cartridge assembly, and is in no way limited to those shown in the figures. Other embodiments, including even more through vias, are also encompassed within the scope of the present invention.

The method of precision cutting the fluid seal from the unprocessed sheet stock will now be described in detail. In contrast to the prior art, which generally used mechanical die cutting processes to form the fluid seals, the present invention uses a laser cutting process. The laser cutting process of the present invention provides advantages over die cutting, in terms of allowing more precise cutting, decreased distortion arising from the cutting process, reduction in particulate debris with sizes >5 $\mu$m, and elimination of lubricants in the cutting process. Further, the laser cutting process permits finer design rules for the fluid seal, providing the possibility of increasing the number of non-communicating ink passages within a given area or of shrinking the overall size of the bonding area to the silicon chip. Such modification in the cutting design rules can not be implemented in the traditional cutting processes.

In embodiments of the present invention, any suitable laser (irradiation) source may be used as the cutting tool. Suitable laser sources include, but are not limited to, solid state lasers such as Nd:YAG (neodymium:yttrium aluminum garnet) lasers and their harmonics at shorter wavelength, ultraviolet lasers such as excimer lasers, free electron lasers, gas discharge lasers such as argon ion or krypton ion lasers or copper vapor lasers, infrared lasers such as Rf (radiofrequency discharge) $CO_2$ lasers or TEA (transverse electric discharge-atmospheric pressure) $CO_2$ lasers, and the like. In preferred embodiments, the material to be cut will absorb the laser. Therefore ultraviolet lasers such as the excimer laser and the $3^{rd}$ harmonic of the Nd:YAG laser are preferred over the fundamental wavelength of the Nd:YAG laser or lasers emitting in the visible light area of the spectrum. Also, the 9.4 $\mu$m wavelength $CO_2$ laser is preferred over the 10.6 $\mu$m $CO_2$ laser because of the higher absorption of most polymers at 9.4 $\mu$m.

Specific selection of a laser source will depend on the composition and physical properties of the material being processed, the thickness of each of the several layers in the sheet stock, the overall thickness of the sheet stock, spatial resolution required, the desired surface quality, and economic considerations such as power consumption, equipment cost, maintenance cost, and processing speed. For example, a Rf $CO_2$ laser may be preferred in some embodiments, because it offers low cost for the laser and its operation and it delivers higher levels of power to the material, enabling rapid processing. However, the design rules for the Rf $CO_2$ laser are limited by the presence of a heat-affected zone 10 $\mu$m–50 $\mu$m width at the cut edges and by a relatively large focused spot diameter typically>50 $\mu$m. In other embodiments, an excimer laser may be preferred because it offers a much finer resolution of 2 $\mu$m–5 $\mu$m and a heat-affected zone<5 $\mu$m, although at higher costs. In still other embodiments, a TEA $CO_2$ laser may be preferred as a compromise between cost, feature size and edge quality.

In embodiments of the present invention, multiple lasers, which can be the same or different, can be used to perform the cutting process. In one such example, multiple excimer lasers could be used to provide sufficient power for rapid cycle times. In a second case, two different lasers could be used. For example, an excimer laser could be used to do the precision cut in the region of the front edge and ink passages. A RF $CO_2$ laser could be used to cut the part in regions away from the front edge that bonds to the die and also cut the sprocket holes used to transport the part in the print cartridge manufacturing robotic system.

Figure 8:
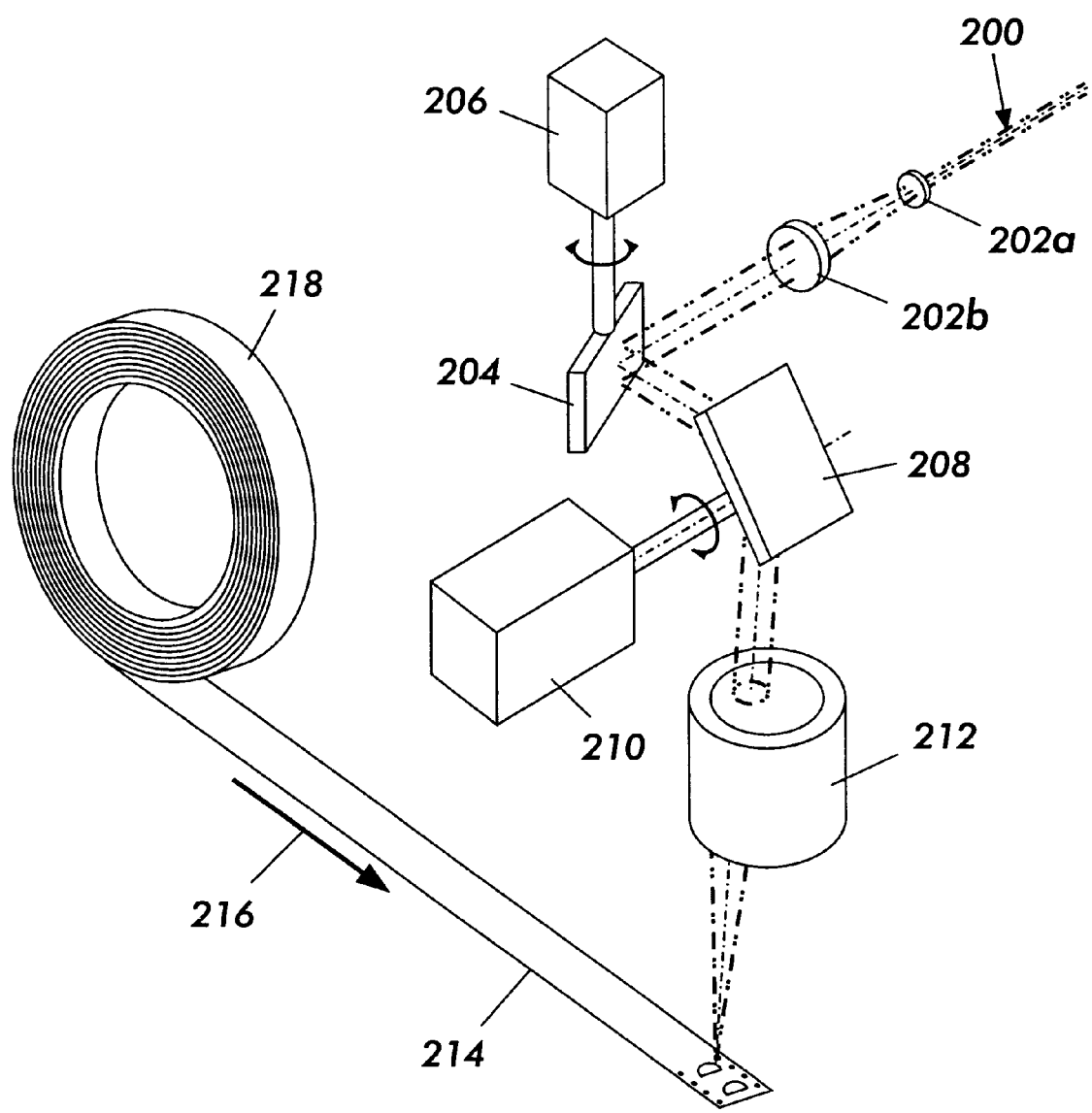
FIG. 8 is a description of a flying spot scanning cutting method.

In embodiments of the present invention, the cutting of the fluid seal, or other member being cut from the sheet stock, can be conducted in several different ways. The choice of method depends on the specific characteristics of the laser and the material processing parameters required. For example, flying spot scanning is most appropriate for CW or high frequency pulsed lasers such as the Rf $CO_2$ and Nd:YAG lasers. In this method, shown generally in FIG. 8, the laser emission 200 originating from a laser source (not shown) is passed through a Galilean beam expander 202a and 202b. The expanded laser emission is reflected by a first deflecting mirror 204 that is operatively connected to an x-axis scanner 206, and a second deflecting mirror 208 that is operatively connected to a y-axis scanner 210, and is then focused to a tight spot by a f$\theta$ flat field scanning lens 212. The focused spot is scanned by means of the mirrors 204, 208 onto the sheet stock 214, which moves in the direction of arrow 216 from a feed roll 218 to a take-up roll (not shown), thereby cutting the desired parts in the sheet stock. Thus in a vector scanning method, the outline of the part and the sprocket holes are cut. By proper control of the scanning speed and laser power, the cut depth can be chosen. Thus, cuts through the fluid seal material can be made while only cutting a small distance into the transporting polyester layer, and holes can be cut completely through the part and the transport substrate for the sprocket holes and possibly the ink passages. The sheet stock can be stationary during the cutting process and then indexed for the cutting of the next part. Alternatively, the sheet stock can be transported at a constant speed while the fluid seal is being cut, having properly accounted for the tape motion in the motion of the galvanometers. In a modification of the flying spot method, which is not shown but will be readily apparent to those skilled in the art, the laser beam is stationary and the raw material is moved in two axes parallel to the plane of the material to be cut.

Figure 9:
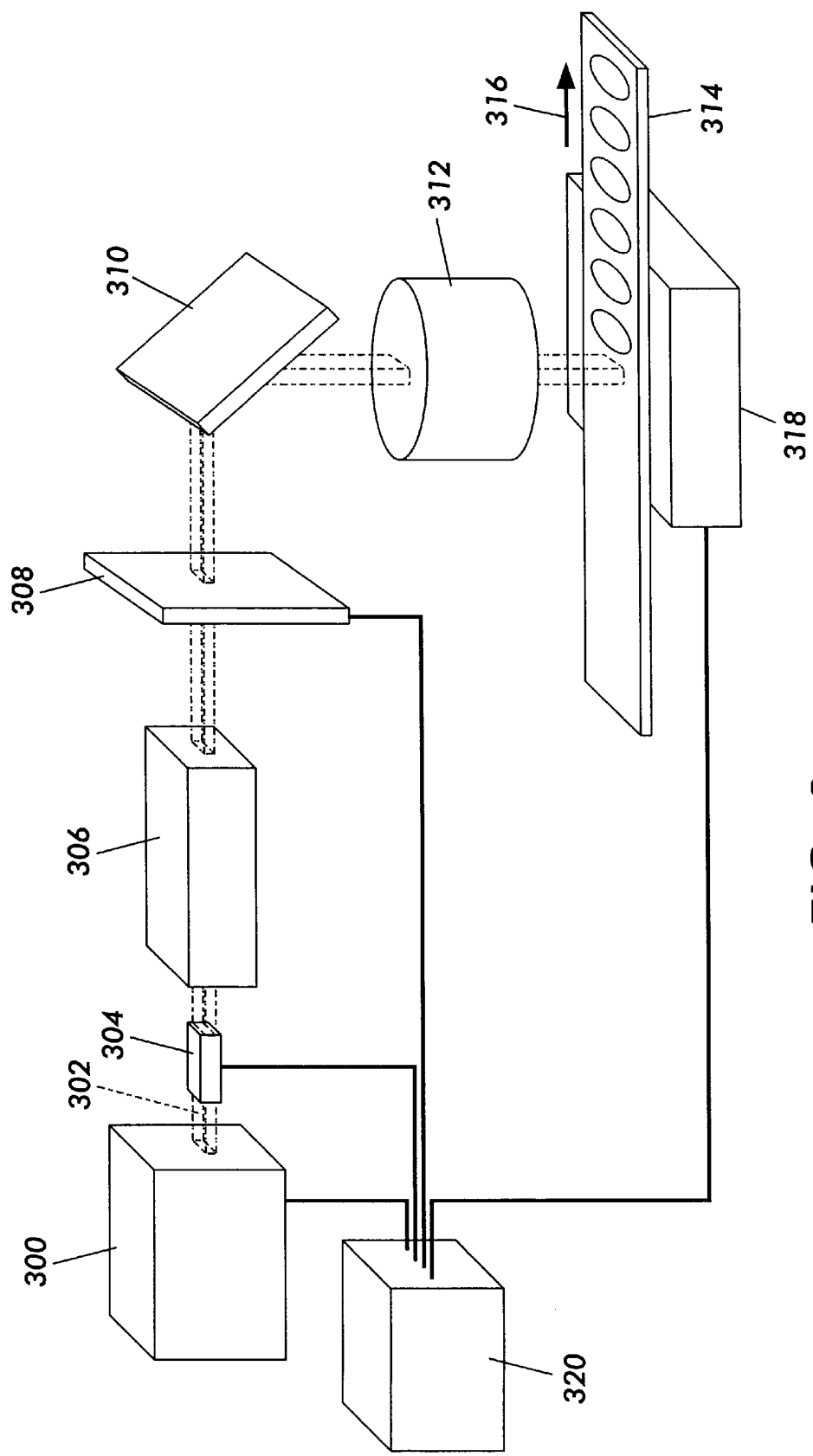
FIG. 9 is a description of an imagewise ablation cutting method.

An alternative cutting method, useful in embodiments of the present invention, is the imagewise ablation method, such as shown in FIG. 9. The imagewise ablation method is most appropriate for short pulse and relatively low frequency (<1 kHz) gas discharge lasers such as excimer and TEA $CO_2$ lasers. In this sort of cutting system, the laser source 300 emits a laser emission 302, which is processed through a variable attenuator 304 and beam shaping stage 306. The laser emission is imaged onto a mask 308 with the pattern of the cut (not shown). The patterned emission is then deflected by deflecting mirror 310 and passes through an appropriate lens 312, after which the emission is imaged onto the sheet stock 314 supported on a cutting stage 318. The sheet stock is transported in the direction of arrow 316 from a feed roll (not shown) to a take-up roll (not shown) and can be either indexed between cutting operations or transported continuously with accounting of the tape motion in the cutting process. Each of the laser source 300, variable attenuator 304, mask 308 and cutting stage 318 are operably connected to a suitable controller 320. Further, the mask 308 is provided such that it can be moved in the x- and y-directions by one or more controllers (not shown). The laser is used to illuminate the mask and forms a laser light image of the area to be cut on the raw material. An appropriate number of pulses from the laser source can remove, by an ablation process, the unwanted material. A modification of the imaging method may also scan some combination of the laser beam illuminator, the mask, and the raw material. Each of these methods is encompassed by the present invention, as well as variants thereof that will be apparent to one skilled in the art based on the present disclosure.

Figure 10:
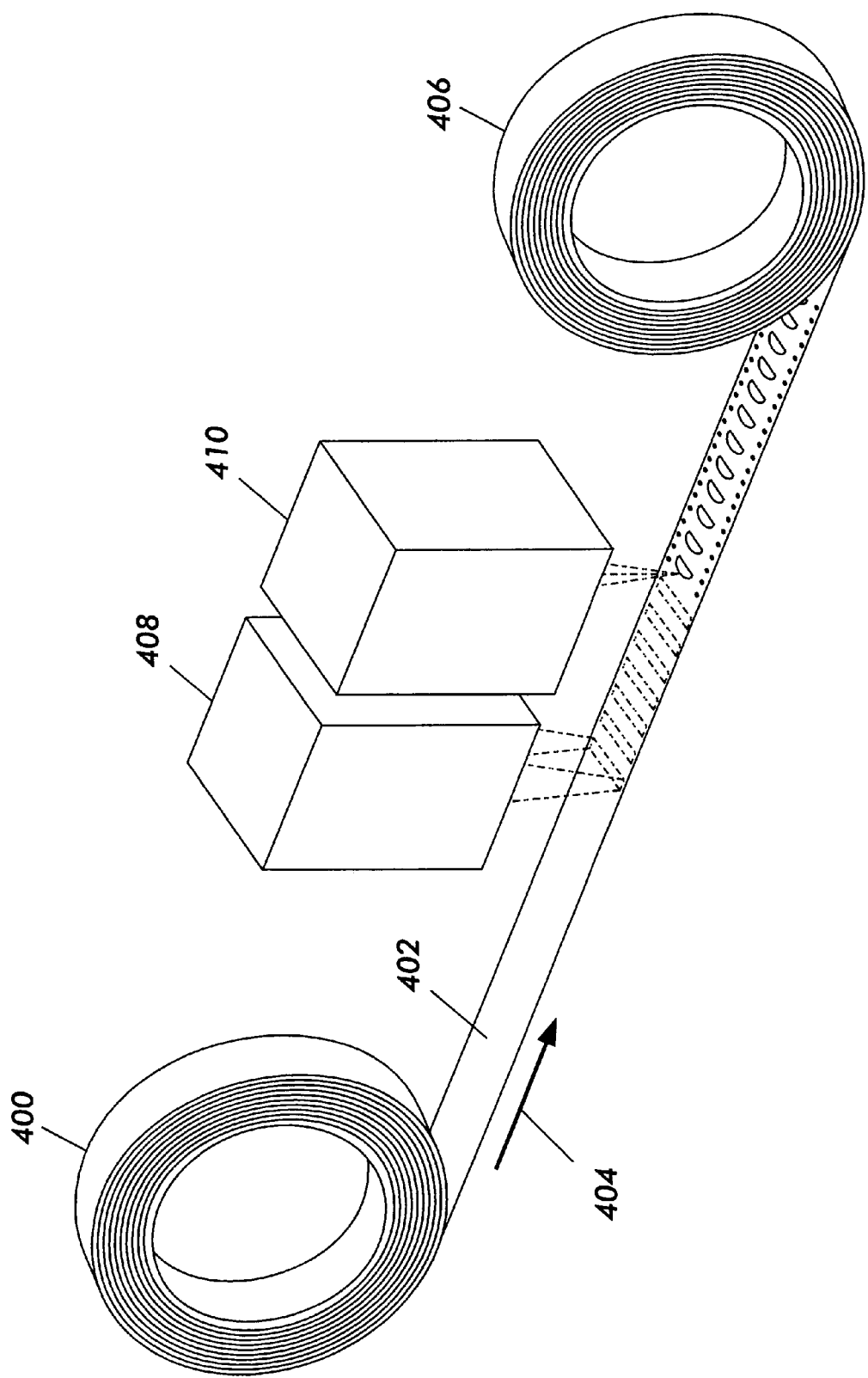
FIG. 10 is a description of a hybrid cutting system.

Still further, as discussed above, a combination of laser sources can be used in a single cutting method, if desired. An example of such a hybrid cutting system is shown generally in FIG. 10. As shown in FIG. 10, the hybrid cutting system may, for example, combine both the flying spot scanning system of FIG. 8 and the imagewise ablation system of FIG. 9. In this hybrid system, the raw material 402 moves in the direction of arrow 404 from a feed roll 400 to a take-up roll 406. The raw material is first imaged by an imagewise ablation cutting system 408 followed by a flying spot cutting system 410, or vice-versa, to form respective cuts in the raw material.

To perform the laser cutting process of the present invention, the energy characteristics of the laser source are preferably adjusted so as to provide the desired penetration depth and cutting properties. For example, in an exemplary embodiment where a KrF excimer laser operating at 248 nm is used as the laser source, the laser can effectively and precisely cut a 350 µm thick tape at an energy density of 0.3 to 3 $J/m^2$. In the case of a $RF/CO_2$ laser source, an laser power of from about 10 to about 500 W, preferably from about 25 to about 300 W, and even more preferably from about 25 to about 150 W, may be used with a spot diameter at the substrate between 50 and 250 µm and more preferably between 60 and 130 µm and scanning speeds between 0.05 and 5 m/s and more preferably between 0.25 and 4 m/s. However, the light intensity will of course depend upon the specific laser source being used and the specific sheet stock being cut, and so values outside of these ranges may be used, as necessary.

Furthermore, it will be readily recognized that the laser processing parameters may be adjusted within broad ranges to account for the specific properties desired, the materials being used, the laser power, and cutting method. For example, the specific laser cutting process parameters, such as fluence, intensity, and cutting speed will depend upon such factors as wavelength and type of the laser, rate of irradiation, pulse width, energy level, and the like. Based on this disclosure one skilled in the art can select such processing parameters for a specific material to be cut.

The laser-cutting process of the present invention can be used for a wide range sheet stock composed of polymeric substrates and adhesives, such as mentioned above. The laser cutting of the present invention can operate well for a wide range of sheet stock thicknesses and for a range of multi-layer structures. In particular, polymer sheet stock of as thin as 6 µm or less and as thick as 1000 µm or more (as well as thickness in between) can be readily cut. Furthermore, adhesive layers, either freestanding or as coatings on substrates, can be cut with thicknesses as thin as 1 µm or less and as thick as 1000 µm or more (as well as thicknesses in between). Multilayer sheet stock, such as the raw material for the fluid seals discussed above, is typically in the thickness range of 200–500 µm, and is cut with no difficulty.

Because laser cutting effects the cutting operation in a much different manner than die cutting, the laser cutting process of the present invention provides significant process and product advantages over the prior art. In particular, the laser cutting process of the present invention allows significant decreases in the minimum feature sizes to obtain reliable bonding. Die cutting generally required large separation between a via and another cut edge to achieve reliable bonding to the die module and to the manifold due to the distortion effects of mechanical cutting. The present invention permits precision cutting, even of high aspect ratio features located close to one another, having small feature size, no mechanical distortion and minimal distortion at the cut edges due to heating effects from the cutting laser. In particular, the present invention permits cutting of individual vias spaced 250 µm or less, preferably spaced 100 µm or less, and more preferably spaced 50 µm or less from a second edge of either another via or another cut edge with no mechanical distortion and heat affected zones less than 25% of the distance between the features. In contrast, design rules for die cut parts generally require>500 µm separation between cut edges to have no more than 25% of the separation distance unperturbed by the mechanical action of the die cutting.

While the precision laser cutting operation of the present invention has been described as being useful in the production of fluid seals for ink jet print cartridges that require precision patterning, the cutting process of the present invention can also be used for a variety of precision cutting purposes in other areas. For example, the laser cutting process of the present invention can be used in any of the various operations in which adhesive seals are produced, or where adhesive or non-adhesive tapes are cut to provide individual parts. In particular, individual parts can be cut from a multi-layer sheet stock where one of the layers of the sheet stock, typically the bottom layer, is not cut through everywhere by the laser cutting process but remains at least partially intact. The intact layer then serves as a transport and handling means to position parts for automatic handling in an assembly line. Thus the cutting process of the present invention can be used to pattern precision cut parts for a wide variety of fields and applications where precision cutting of small parts or features is required and where handling of a large number of parts on a continuous tape is convenient or required.

The following examples are illustrative of embodiments of the present invention, but are not limiting of the invention. It will be apparent that the invention can be practiced with many different laser cutting sources and types of sheet stock and can be used for a variety of different uses in accordance with the disclosure above and as pointed out hereinafter.

EXAMPLES

Example 1

A tape consisting of 5 layers is provided as the sheet stock from which fluid seals for an ink jet print cartridge are to be cut. The central 3 layers constitute a double-sided tape and the outer two layers are removable release liners. The top release liner is 37.5 $\mu$m thick, the first adhesive layer is 50 $\mu$m thick, the tape substrate is 175 $\mu$m thick, the second adhesive layer is 50 $\mu$m thick, and the final release liner that also serves as the transporting substrate for the reel of fluid seal parts is 75 $\mu$m thick.

Fluid seal parts are cut from the sheet stock using a hybrid cutting method and system, such as that described above with reference to FIG. 10. A KrF excimer laser operating at a wavelength of 248 nm is used as the cutting source for the fine detail portion of the part that includes the ink passages and the front edge of the fluid seal. A Rf $CO_2$ laser operating at 9.4 $\mu$m is used to cut the fluid seal around the remaining peripheral region while leaving the backing layer intact and also to cut out the sprocket holes for the tape transport mechanism. The excimer laser is used to illuminate a mask that is imaged on the fluid seal raw material, set to irradiate the sheet stock at an energy density of from 0.4 to 3 J/cm$^2$. The mask transmits the excimer light in the region of the ink passages and in a line that defines the front edge of the fluid seal. Alternately, the mask could be a phase or diffraction mask that redirects the beam to the regions to be cut. The excimer cut partially defining the part is transported to a second zone where a flying-spot $CO_2$ laser cutting system cuts the sprocket holes completely through the raw material and also fully excises the fluid seal while cutting only approximately 25 $\mu$m into the transporting substrate. The through cut and partially through cut can be selectively made by adjusting the laser power and cutting speed appropriately. The two cutting processes are done simultaneously in parallel on different parts so that the part processing time is that given by the slowest cutting process. In this case the excimer laser cutting process takes 2–5 seconds. Also the cutting system is rather complicated and costly since two complete laser systems with their control and imaging optics are required.

This precision cutting operation provides for the cutting of fluid seals having high aspect ratio features. In particular, fluid seals are cut having bonding areas of as small as 50 $\mu$m wide in the vicinity of the excimer laser cut, without any distortions in the cut piece.

Example 2

The same 250 $\mu$m fluid seal material used in Example 1 above is again provided as the sheet stock, from which fluid seals for an ink jet print cartridge are to be cut. The same processing is used as in Example 1, except that the excimer laser is replaced by a TEA $CO_2$ laser as the cutting source for the ink passages and front edge. The TEA $CO_2$ laser operating at 9.4 $\mu$m is used in an imaging mode similar to that of the excimer laser, except that the ultraviolet imaging system is replaced by an imaging system appropriate to the infrared laser. The laser is set to irradiate the sheet stock at an energy density of 0.5–15 J/cm$^2$.

Example 3

The same 250 $\mu$m thick fluid seal tape used in Example 1 above is again provided as the sheet stock, from which fluid seals for an ink jet print cartridge are to be cut. The same processing is used as in Example 1, except that the entire part is cut with the flying spot Rf $CO_2$ laser operating at 9.4 $\mu$m. In this case the cutting parameters of scan speed and laser power can be optimized for the precision cut at the front edge and ink passages and optimized at different set points for higher speed in cutting the remaining contour of the part while leaving the backing layer intact and another combination of settings for the transport holes. The laser can operate at powers of 5–250 W and at flying spot speeds of 0.1–15 m/s.

For the Rf $CO_2$ laser, a heat-affected zone of as small as 10 $\mu$m can be accomplished and unperturbed features of <100 $\mu$m can be obtained. The cutting time for the entire part can be <1 s. Although the parts cut with a single Rf $CO_2$ laser cannot have quite as small design rules as the parts cut with the excimer laser, the very short cycle time for cutting a complete part and the simplified and lower cost cutting equipment make this advantageous if the required design rules are not too small.

In each of the Examples 2 and 3, as in Example 1, the precision cutting operations provide for the cutting of fluid seals having high aspect ratio features spaced relatively close to one another. The fluid seals are cut on a continuous web by cutting to an appropriate depth and leaving the carrier intact.

As will be apparent to one of ordinary skill in the art, numerous changes, alterations and adjustments can be made to the above-described embodiments without departing from the scope of the invention, and the invention is in no way limited to the specific exemplary embodiments described above. One skilled in the art will recognize that the various aspects of the invention discussed above may be selected and adjusted as necessary to achieve specific results for a particular application. Thus, the foregoing embodiments are intended to illustrate and not limit the present invention. It will be apparent that various modifications can be made without departing from the spirit and scope of the invention.

What is claimed is:

1. A process for precision patterning of a sheet stock, comprising:

irradiating a surface of a sheet stock with an irradiation source to pattern a part in said sheet stock, and cutting to at least one controlled depth in said sheet stock with said irradiation source, wherein said part has cut features separated by 500 $\mu$m or less and having less than 25% of a separation distance between the cut features perturbed by the cutting process.

2. The process of claim 1, wherein said sheet stock comprises an adhesive material.

3. The process of claim 2, wherein said adhesive material is a double-sided adhesive tape.

4. The process of claim 3, wherein said part is a fluid seal member for a microfluidic device.

5. The process of claim 4, wherein said fluid seal member is for an ink jet print cartridge.

6. The process of claim 3, wherein a portion of said fluid seal member has cut features separated by 250 µm or less and having less than 25% of the separation distance between the cut features perturbed by the cutting process.

7. The process of claim 6, wherein a portion of said fluid seal member has cut features separated by 100 µm or less and having less than 25% of the separation distance between the cut features perturbed by the cutting process.

8. The process of claim 2, wherein said adhesive material comprises an adhesive selected from the group consisting of epoxies, phenolic nitrile resins, acrylics, silicones, hot-melt thermoplastics, pressure sensitive adhesives, rubber thermosets, and mixtures thereof.

9. The process of claim 2, wherein said sheet stock further comprises a release layer on each side of said adhesive material.

10. The process of claim 9, where the adhesive material is cut through while one of the release layers is left intact.

11. The process of claim 10, where the intact release layer forms a continuous web that supports parts cut from the adhesive material.

12. The process of claim 1, wherein said irradiation source is a laser.

13. The process of claim 12, wherein said laser is selected from the group consisting of a solid state laser, an infrared laser, a free electron laser, a gas discharge laser, a visible light laser, and an ultraviolet laser.

14. The process of claim 13, wherein said laser is a Rf $CO_2$ laser or a TEA $CO_2$ laser.

15. The process of claim 13, wherein said laser is an ultraviolet laser selected from the group consisting of an excimer laser and the third or fourth harmonic of a solid state laser.

16. The process of claim 15, wherein said laser is an excimer laser selected from the group consisting of a KrF laser, a XeF laser, a XeCl, and an ArF laser.

17. The process of claim 12, wherein the pattern is made using a flying spot cutting process using said laser.

18. The process of claim 12, wherein the pattern is defined by an imaging ablation process using said laser.

19. The process of claim 12, wherein the pattern is made with a hybrid system comprising both a flying spot cutting system for cutting a portion of the part and an imaging ablation system for cutting another portion of the part.

20. The process of claim 1, wherein said part is a fluid seal member.

21. The process of claim 1, wherein said patterning is conducted in an imaging mode, wherein said irradiation source is imaged onto said sheet stock.

22. The process of claim 1 wherein said patterning cuts into or through said sheet stock to form said part.

23. The process of claim 1, wherein said patterning is conducted using a flying spot scanning method.

24. The process of claim 1, wherein said sheet stock comprises a polymer selected from the group consisting of polyesters, polyimides, polyetheretherketones, polyamides, polysulfones, polyethersulfones, and polyetherimides.

25. The process of claim 1, wherein said sheet stock is a double-sided adhesive tape, said irradiation source is a Rf $CO_2$ laser, and said patterning is conducted using a flying spot scanning method.

26. A process for precision cutting a discrete part from a sheet stock, comprising:
    irradiating a surface of a sheet stock with a laser source to cut a discrete part from said sheet stock,
    wherein said discrete part has cut features separated by 500 µm or less and having less than 25% of a separation distance between the cut features perturbed by the cutting process.

27. The process of claim 26, wherein said sheet stock comprises an adhesive material.

28. The process of claim 27, wherein said discrete part is an adhesive fluid seal.

29. The process of claim 28, wherein said fluid seal is an inkjet print cartridge fluid seal.

30. The process of claim 29, wherein a portion of said fluid seal has cut features separated by 250 µm or less and having less than 25% of the separation distance between the cut features perturbed by the cutting process.

* * * * *